United States Patent
Miyake (10) Patent No.: US 8,045,234 B2
(45) Date of Patent: Oct. 25, 2011

(54) IMAGE FORMING APPARATUS

(75) Inventor: Kazunori Miyake, Toride (JP)

(73) Assignee: Canon Kabushiki Kaisha (JP)

( * ) Notice: Subject to any disclaimer, the term of this patent is extended or adjusted under 35 U.S.C. 154(b) by 720 days.

(21) Appl. No.: 12/136,753

(22) Filed: Jun. 10, 2008

(65) Prior Publication Data

US 2008/0304093 A1    Dec. 11, 2008

(30) Foreign Application Priority Data

Jun. 11, 2007 (JP) .................. 2007-154402

(51) Int. Cl.
*H04N 1/46* (2006.01)
(52) U.S. Cl. .......... 358/3.26; 358/400; 358/500
(58) Field of Classification Search .......... 358/1.13, 358/1.14, 1.15, 1.16, 1.17, 1.18, 1.9, 474, 358/475, 479, 480, 486, 487, 488, 494, 497, 358/498, 500, 505, 506, 509, 527

See application file for complete search history.

(56) References Cited

U.S. PATENT DOCUMENTS

| | | | | |
|---|---|---|---|---|
| 6,801,343 B1 * | 10/2004 | Sheng | ............... | 358/474 |
| 7,072,082 B2 * | 7/2006 | Yokota | ............... | 358/497 |
| 2006/0050327 A1 * | 3/2006 | Lim | ............... | 358/474 |

FOREIGN PATENT DOCUMENTS

JP    2-308667 A    12/1990

* cited by examiner

*Primary Examiner* — James A Thompson
(74) *Attorney, Agent, or Firm* — Rossi, Kimms & McDowell LLP (57) ABSTRACT

An image forming apparatus with an image reading apparatus that may suppress the intensity level of radiated noise from the image reading apparatus in an appropriate manner, without disrupting other functions, etc. The movable image reading apparatus comprises a carriage having a light source adapted to expose an original to light, a photoelectric conversion element, and a drive circuit unit adapted to drive the photoelectric conversion element; and a plurality of guide members adapted to movably guide the carriage. The plurality of guide members are individually earthed to a housing of the image forming apparatus through a plurality of earth contacts.

7 Claims, 8 Drawing Sheets

IMAGE FORMING APPARATUS

BACKGROUND OF THE INVENTION

1. Field of the Invention

The present invention relates to an image forming apparatus with an image reading apparatus, and more particularly, to an image forming apparatus that suppresses noise radiating from an image reading apparatus.

2. Description of the Related Art

Image reading apparatuses are often connected to a printer or the like and used as one of the components of image forming apparatuses such as copiers or multi-function peripherals (MFPs), although they may be used standalone.

Figure 7:
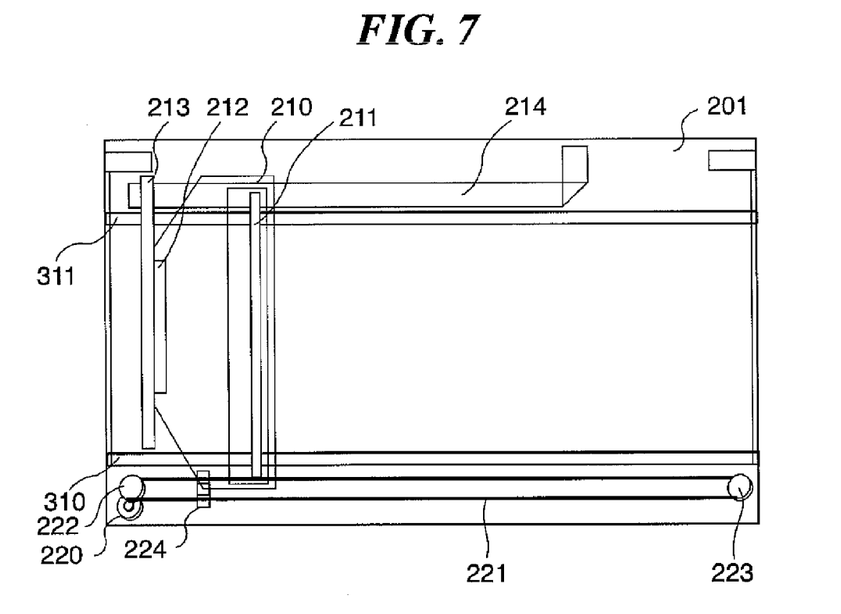
FIG. 7 is a top view schematically showing a configuration of a conventional image reading apparatus (and image forming apparatus).

FIG. 7 is a top view of an image forming apparatus with an image reading apparatus, wherein components of a movable image reading apparatus 201 are mainly illustrated. In FIG. 7, the movable image reading apparatus 201 has a carriage 210, and the carriage 210 has a lamp 211, an image sensor 212, and an image sensor substrate 213.

The lamp 211 serves as a light source that emits light to an original. The emitted light is reflected by the original. Then, the reflected light is incident on the image sensor 212 through a lens or the like (not illustrated). The image sensor 212 includes a photoelectric conversion element such as a line CCD, and it is mounted on the image sensor substrate 213. The image sensor 212 is driven by an image sensor driving circuit 215 formed in the image sensor substrate 213 (see FIG. 8).

The carriage 210 is coupled to a timing belt 221. The timing belt 221 is rotatably supported by a driving pulley 222 and a driven pulley 223. The driving pulley 222 is connected via a gear or the like to a rotating shaft of a stepping motor 220. In addition, the carriage 210 is slidably fitted into a guide shaft 310 and slidably engaged with a guide rail 311. Further, the guide shaft 310 and the guide rail 311 are mounted on a side surface of the image reading apparatus 201 at a predetermined spaced-apart distance from, and in parallel to, a platen glass formed on the ceiling surface of the image reading apparatus 201.

According to this configuration, the carriage 210 is moved in right and left directions in FIG. 7 reciprocally along the bottom surface of the platen glass by forward/reverse rotations of the stepping motor 220, by which the original (information on the original) is exposed and scanned accordingly. In this case, a position sensor 224 senses that the carriage 210 is moved to its home position. Upon sensing, the rotational direction of the stepping motor 220 is reversed.

Figure 8:
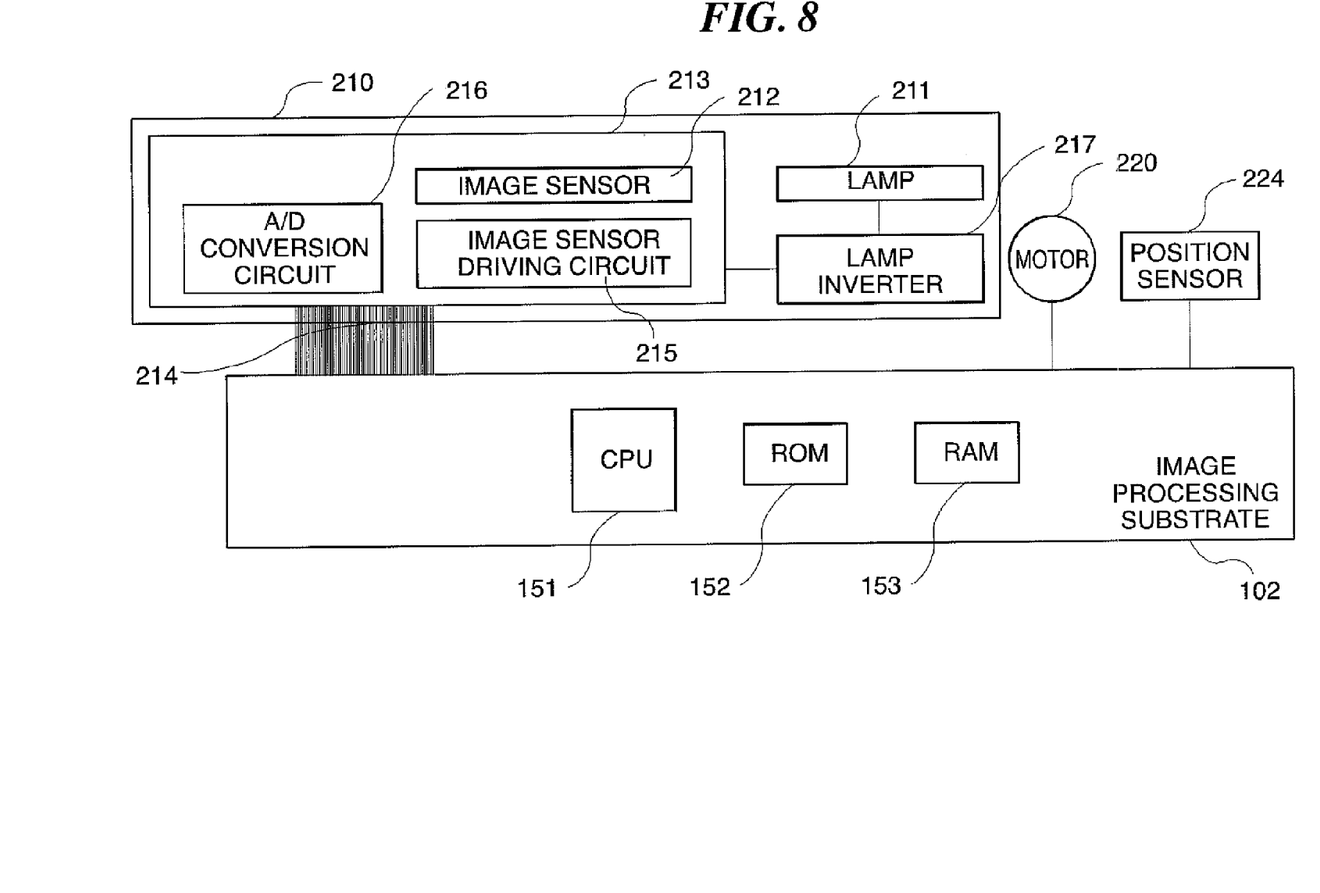
FIG. 8 is a block diagram schematically showing a configuration of the control system of the image reading apparatus of FIG. 7.

FIG. 8 is a block diagram schematically showing a configuration of the control system of the movable image reading apparatus 201. The carriage 210 has not only the above-mentioned lamp 211, image sensor 212, and image sensor substrate 213, but also a lamp inverter 217 to turn on the lamp 211. In addition, an A/D conversion circuit 216 and an image sensor driving circuit 215 (a drive circuit unit) are mounted on the image sensor substrate 213 together with the image sensor 212. The image sensor 212 photoelectrically converts the image light associated with the original under a drive control of the image sensor driving circuit 215 and outputs as an analog image signal. The analog image signal is converted to a digital image signal by the A/D conversion circuit 216.

The digital image signal is transferred to an image processing substrate 102 (an image processing unit within the image reading apparatus) through a video cable 214. The video cable 214 includes a flexible flat cable (harness). The image processing substrate 102 is provided with a CPU 151 that controls the image reading apparatus 201, a RAM 153, and a ROM 152 that stores program for controlling the image reading apparatus 201. Between the image processing substrate 102 and the image sensor substrate 213, for example, signals are transmitted and received through the video cable 214. In this case, for example, the image processing substrate 102 supplies power from the power source and driving signals for the image sensor 212 to the image sensor substrate 213. On the other hand, the image sensor substrate 213 outputs, e.g., digitized image signals to the image processing substrate 102.

The image sensor driving circuit 215 supplies to the image sensor 212 a driving clock signal with a high frequency of on the order of 10 MHz to read a signal charge (an image signal) from the image sensor 212. Supplying such a high-frequency driving clock signal generates noise. The generated noise is radiated from the image sensor substrate 213 or the video cable 214. The radiated noise has a negative impact on, e.g., electric appliances.

Measures for alleviating such radiated noise from the above harness (the video cable 214) include a method using a flexible flat video cable with an electrostatic shield (see, for example, Japanese Laid-Open Patent Publication (Kokai) No. 02-308667). As described above, providing an electrostatic shield to the video cable 214 could reduce the radiated noise to some extent.

However, there has not been achieved sufficient reduction in such radiated noise, because feeble radiated noise leaked from the harness or the substrate provided with such an electrostatic shield is combined with the electrically instable conductive members in vicinity and those conductive members become antennas accordingly, so that radiation efficiency increases.

In the image forming apparatus with the above-mentioned image reading apparatus 201, the guide shaft 310 and the guide rail 311 of the image reading apparatus 201 may serve as the above-mentioned antennas.

That is, the guide shaft 310 and the guide rail 311 of the image reading apparatus 201 are earthed by conductive members such as earth lines or sheet metals with a side surface of the housing of the image reading apparatus 201 used as an earth path. The purpose of using a side surface of the housing of the image reading apparatus 201 as an earth path is to allow the carriage 210 to move successfully in an image reading operation. In addition, the housing of the image reading apparatus 201 and the housing of the image forming apparatus 101 are earthed at the rear-end portion of the side surface.

However, in such earth connection, as an earth path involves a large number of members, the length of the earth path becomes longer and contains impedance accordingly. As a result, this leads to electrical instability, particularly in higher frequency regions, and increases an intensity level of the radiated noise.

Figure 9:
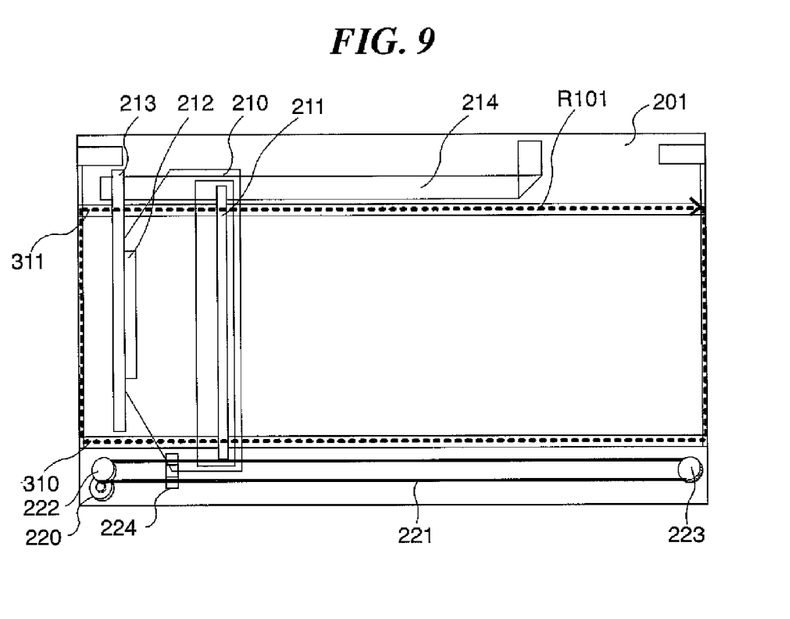
FIG. 9 is a view illustrating a GND loop formed on the image reading apparatus of FIG. 7.

Further, in the above-mentioned earth connection, a GND (ground) loop R101 is formed by the guide shaft 310, the guide rail 311, and the conductive members through which the guide shaft 310 and the guide rail 311 are connected to each other (see FIG. 9). The GND loop R101 serves as a loop antenna so that the intensity level of radiated noise increases at a wavelength corresponding to N and 1/N times the loop length.

It is considered, as an approach for reducing the intensity level of radiated noise, to reduce the loop area or the loop current of a GND loop. However, the reduced loop area would lead to reduction in size of readable originals, etc., which would not be considered feasible. In addition, the reduced loop current would lead to decrease in quality of the read images or the like, which would not be considered feasible.

SUMMARY OF THE INVENTION

The present invention provides an image forming apparatus with an image reading apparatus that may suppress the intensity level of radiated noise from the image reading apparatus in an appropriate manner, without disrupting other functions, etc.

In a first aspect of the present invention, there is provided an image forming apparatus with a movable image reading apparatus, the movable image reading apparatus comprising a carriage having a light source adapted to expose an original to light, a photoelectric conversion element, and a drive circuit unit adapted to drive the photoelectric conversion element; and a plurality of guide members adapted to movably guide the carriage, wherein the plurality of guide members are individually earthed to a housing of the image forming apparatus through a plurality of earth contacts.

According to the present invention, it is possible to reduce impedance in each earth path associated with each of the guide members and inhibit any loop in earth paths, by providing a plurality of earth contacts adapted to earth a plurality of guide members to the image forming apparatus individually. Accordingly, this allows the intensity level of radiated noise from the image reading apparatus to be reduced in an appropriate manner, without disrupting other functions, etc.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

DETAILED DESCRIPTION OF THE PREFERRED EMBODIMENTS

Preferred embodiments of the present invention will be now described in detail with reference to the drawings.

Figure 1:
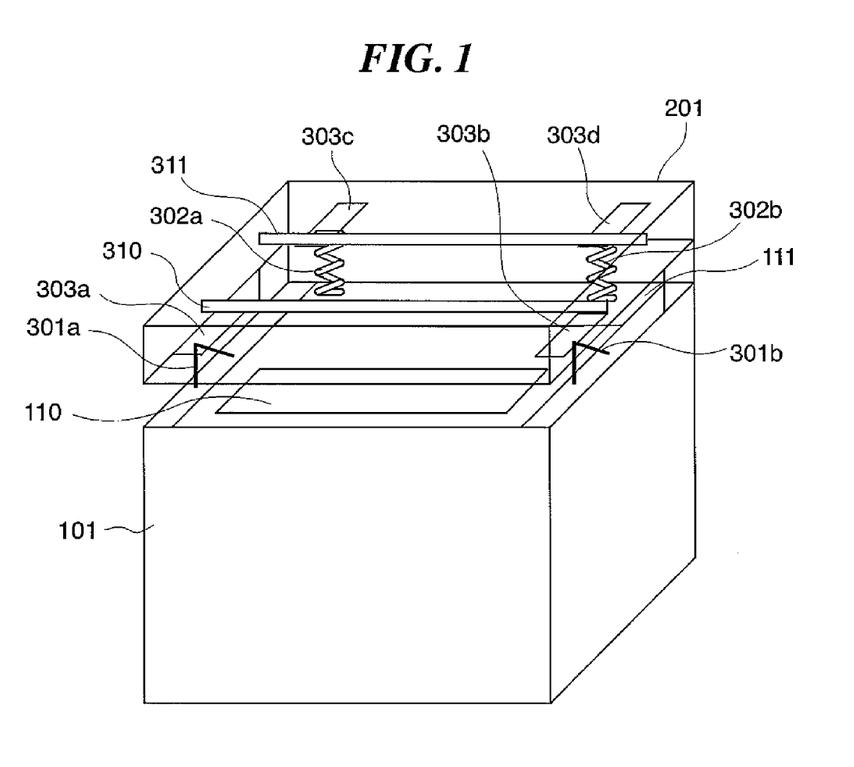
FIG. 1 is a view schematically showing a configuration of an image forming apparatus according to an embodiment of the present invention, with its image reading apparatus in its closed position.
Figure 2:
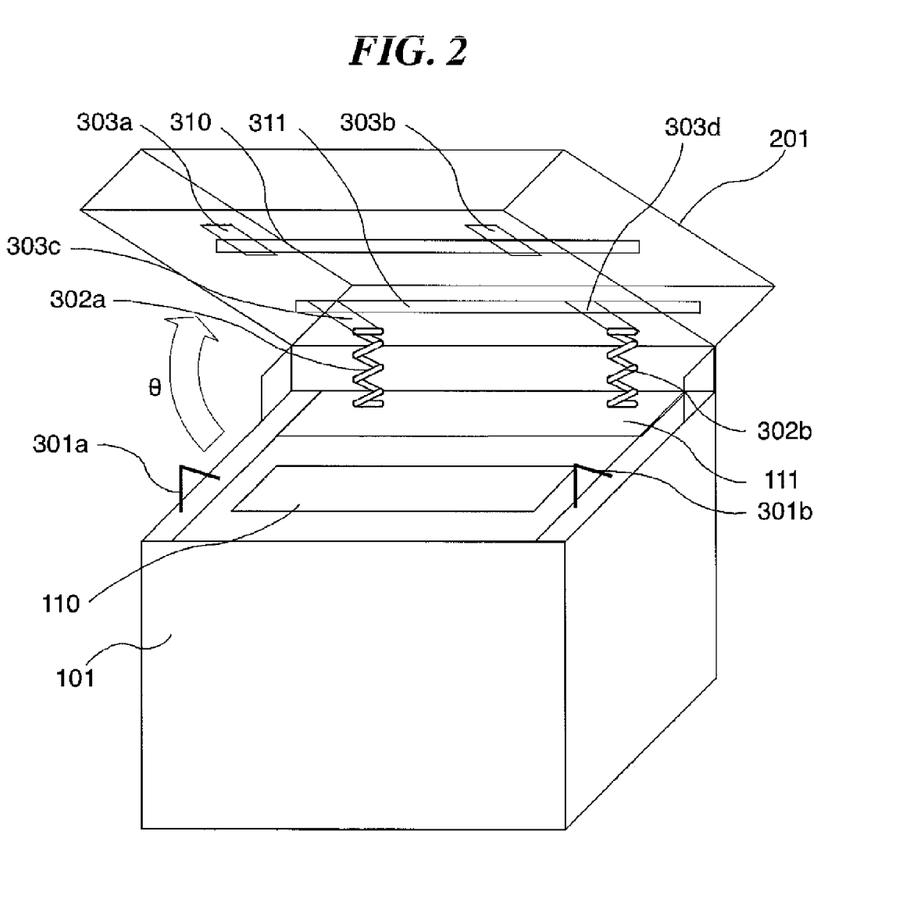
FIG. 2 is a view schematically showing a configuration of the image forming apparatus of FIG. 1, with the image reading apparatus in its open position.
Figure 3:
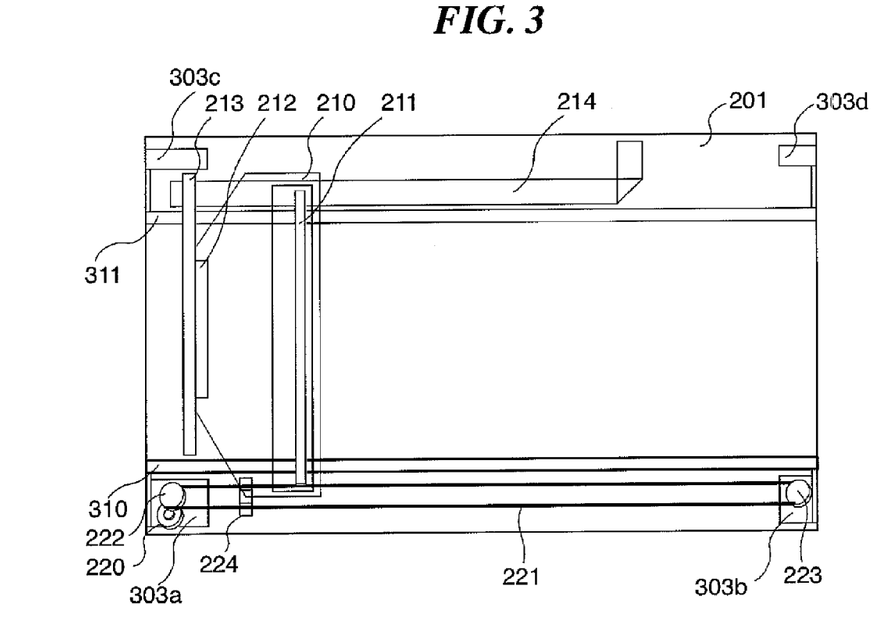
FIG. 3 is a top view of the image forming apparatus (and image reading apparatus) of FIG. 1.

FIG. 1 is a view schematically showing a configuration of an image forming apparatus according to an embodiment of the present invention, with its image reading apparatus in its closed position. FIG. 2 is a view schematically showing a configuration of the image forming apparatus of FIG. 1, with the image reading apparatus in its opened position. FIG. 3 is a top view of the image forming apparatus (and image reading apparatus) of FIG. 1.

As illustrated in FIGS. 1 and 2, the image reading apparatus 201 is mounted on the top of the image forming apparatus 101 in an openable and closable manner with a hinge mechanism. Each configuration of the image forming apparatus 101 and the image reading apparatus 201 is basically the same as that conventionally practiced as described earlier (FIGS. 7 to 9). Herein, like reference numerals refer to like elements, and a description will mainly be made to the differences therebetween.

The image forming apparatus 101 according to an embodiment of the present invention is different from that conventionally practiced in how the guide shaft 310 and the guide rail 311 of the image reading apparatus 201 is connected to the ground (or earthed). That is, in this embodiment, the guide shaft 310 and the guide rail 311 as guide members are earthed to the image forming apparatus 101 individually, instead of electrically connecting these through conductive members. In this earth connection, conductive members 303a, 303b, 303c, 303d are provided on both ends of each of the guide shaft 310 and the guide rail 311, i.e., the guide members, as earth contacts at the image reading apparatus 201.

Besides, since the guide shaft 310 and the guide rail 311 are slidably moved with the carriage 210 in image reading operations, they include durable metallic members (conductive members) as conventionally practiced. On the contrary, in this embodiment, the housing of the image reading apparatus 201 include non-conductive members for, e.g., reduced costs and weight saving.

Figure 4:
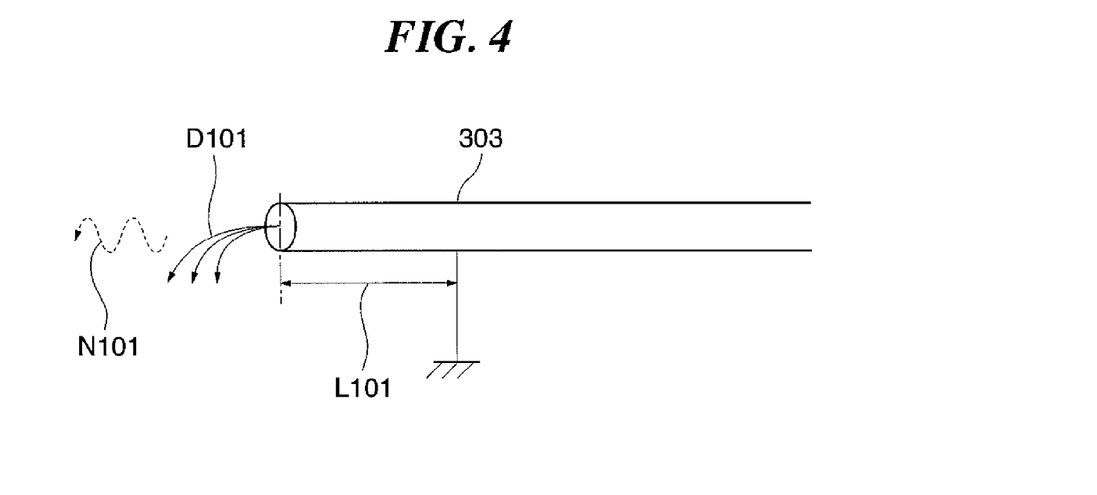
FIG. 4 is a conceptual view illustrating the radiated noise from one end of the conductive members.

The purposes of providing the conductive members 303a, 303b, 303c, 303d will now be described below. In this embodiment, as described above, since the housing of the image reading apparatus 201 include non-conductive members, the ends of the guide shaft 310 and the guide rail 311 become electrical open ends, respectively. As such, when the ends of the guide shaft 310 and the guide rail 311 corresponding to the conductive members become electrical open ends, as illustrated in FIG. 4, a region with a lineal length L101 serves as a monopole antenna. That is, magnetic lines of force D101 are generated with respect to the open ends of the guide shaft 310 and the guide rail 311 and radiated noise N101 in vertical direction is propagated.

To this extent, in this embodiment, as earth contacts that prevent the ends of the guide shaft 310 and the guide rail 311 from serving as antennas, the conductive members 303a, 303b, 303c, 303d are provided on those ends, respectively.

Figure 5:
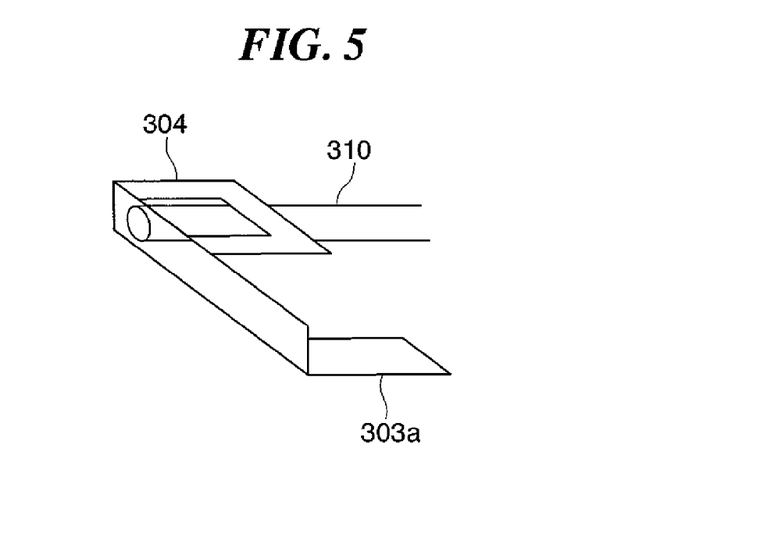
FIG. 5 is a view illustrating an exemplary connection between the guide member of the carriage and one of the conductive members (earth contacts).

Besides, in this embodiment, each of the conductive members 303a, 303b, 303c, 303d include such members in which blade spring 304 is integrally formed therewith and are electrically connected to the ends of the guide shaft 310 and the guide rail 311 through the blade spring 304 (see FIG. 5).

However, by way of an example, FIG. 5 illustrates only a part of the conductive member 303a.

The earth contacts at the image forming apparatus 101 will now be described below. Wire springs 301a and 301b as earth contacts are arranged at a position, opposed to the conductive members 303a, 303b connected to the guide shaft 310, on the side sheet metals that constitute the housing of the image forming apparatus 101. In addition, coil springs 302a and 302b as earth contacts are arranged at a position, opposed to the conductive members 303c and 303d connected to the guide rail 311, on the upper sheet metal that constitute the housing of the image forming apparatus 101. The wire springs 301a, 301b and the coil springs 302a, 302b are configured as metallic or conductive spring members.

That is, in this embodiment, one end of the guide shaft 310 is earthed to the image forming apparatus 101 following a route form the conductive member 303a to the wire spring 301a, while the other end earthed to the image forming apparatus 101 following a route from the conductive member 303b to the wire spring 301b. In addition, one end of the guide rail 311 is earthed to the image forming apparatus 101 following a route from the conductive member 303c to the coil spring 302a, while the other end earthed to the image forming apparatus 101 following a route from the conductive member 303d to the coil spring 302b.

In other words, the guide shaft 310 and the guide rail 311 are earthed to the image forming apparatus 101 individually, without being electrically connected through conductive members. This may achieve reduced impedance due to the shorter earth paths associated with the guide shaft 310 and the guide rail 311, and it may avoid formation of any GND loop including the guide shaft 310 and the guide rail 311.

Accordingly, such reduced impedance in each earth path associated with the guide shaft 310 and the guide rail 311 will also reduce noise currents flowing into the guide shaft 310 and the guide rail 311 as well as the intensity level of any radiated noise. Besides, the coil springs 302a and 302b may provide a larger contact area with respect to the other members in comparison to the wire springs 301a and 301b. Accordingly, there are provided larger effects of the above-mentioned impedance reduction, i.e., the reduction in the intensity level of the radiated noise, in an earth path associated with the guide rail 311 than in another associated with the guide shaft 310.

In addition, given that formation of any GND loop including the guide shaft 310 and the guide rail 311 may be avoided, the intensity level of the radiated noise may also be reduced.

Besides, as described above, in this embodiment, the wire springs 301a and 301b as earth contacts are mounted on the side sheet metals of the image forming apparatus 101. Therefore, a user may easily perform such tasks as removing a jammed sheet of recording paper associated from a paper output tray 110 or attaching/removing a fuser, without contact on the earth contacts. In addition, to facilitate these tasks, it is not necessary to provide a larger horizontal width of the image forming apparatus 101 (the width in right and left directions in FIGS. 1 and 2).

Figure 6A:
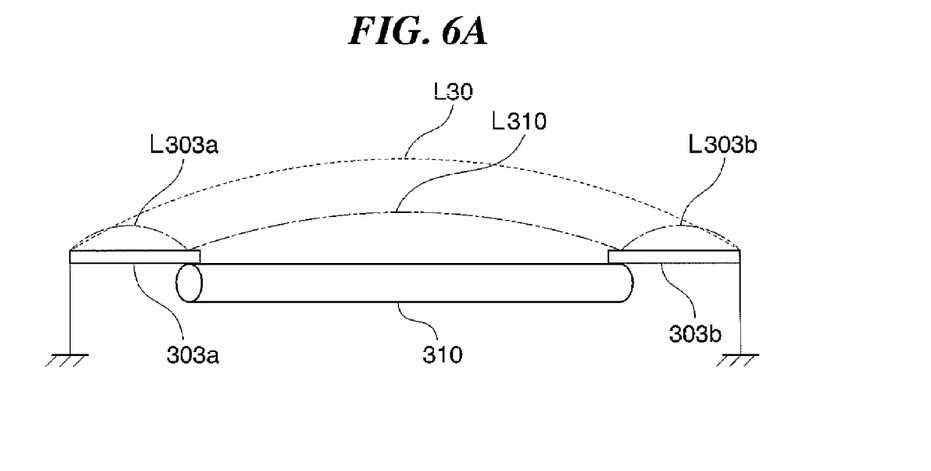
FIG. 6A is a view illustrating the length of the guide shaft of the carriage and the length of the conductive members (earth contacts)
Figure 6B:
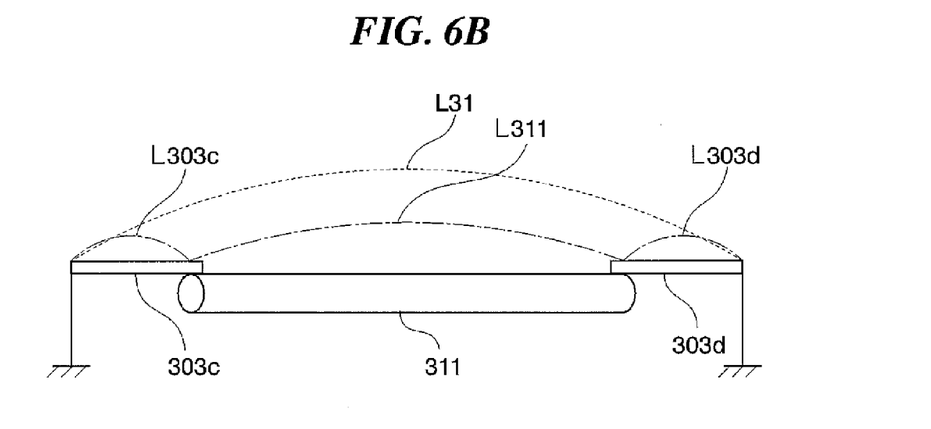
FIG. 6B is a view illustrating the length of the guide rail of the carriage and the length of the conductive members (earth contacts).

Referring now to FIGS. 6A and 6B, each length of the conductive members 303a, 303b, 303c, 303d as earth contacts at the image reading apparatus 201 will be described below.

FIG. 6A is a view schematically showing the connection length between the guide shaft 310 and the conductive members 303a, 303b, and FIG. 6B is a view schematically showing the connection length between the guide rail 311 and the conductive members 303c, 303d.

In the earth path associated with the guide shaft 310, such a resonance is caused with a frequency with the length L310 of the guide shaft 310 being a one-half wavelength ($\lambda/2$) thereof. Similarly, in the earth path associated with the guide shaft 310, such a resonance is caused with a frequency with each of the length L303a of the conductive member 303a and the length L303b of the conductive member 303b being $\lambda/2$. Further, in the earth path associated with the guide shaft 310, a resonance is caused with a frequency with L310+L303a+L303b=length of L30, i.e., the entire length of the earth path associated with the guide shaft 310 being $\lambda/2$.

In addition, in the earth path associated with the guide rail 311, a resonance is also generated. That is, in the earth path associated with the guide rail 311, a resonance is caused with a frequency with the length L311 of the guide rail 311 being one-half wavelength ($\lambda/2$). In addition, in the earth path associated with the guide rail 311, a resonance is caused with a frequency with each of the length L303c of the conductive member 303c and the length L303d of the conductive member 303d being $\lambda/2$. Further, in the earth path associated with the guide rail 311, a resonance is caused with a frequency with L311+L303c+L303d=length of L31, i.e., the entire length of the earth path associated with the guide rail 311 being $\lambda/2$. Upon generation of these resonances, there is provided improved antenna efficiency and higher intension levels of the radiated noise.

Since the guide shaft 310 and the guide rail 311 are generally supported by side surfaces of the housing of the image reading apparatus 201, the length of the guide shaft 310 and the guide rail 311 are consistent with the horizontal width of the housing of the image reading apparatus 201.

Consequently, if the length of each of the conductive members is L303a=L303b=L303c=L303d=L303, then resonances are caused in four positions at the image reading apparatus 201 with a frequency with the length of L303 being $\lambda/2$, which would result in increase in the intensity level of the radiated noise for that frequency. Further, if L30=L31 holds, then resonances are caused at two positions at the image reading apparatus 201 with a frequency with the length being $\lambda/2$, which would result in increase in the intensity level of the radiated noise for that frequency.

Therefore, in this embodiment, letting L303a≠L303b≠L303c≠L303d and L30≠L31 enables resonant frequencies to be shifted depending on the length of an earth path of each of the conductive members. Accordingly, shifting the resonant frequencies may avoid generation of resonances with the same frequency in a superimposed manner and reduce the intension level of the radiated noise.

In addition, the present invention is not intended to be limited to the above-mentioned embodiments, and the earth contacts according to the embodiments may be applied to other embodiments with, e.g., three and more guide members adapted to guide the travel direction of the carriage 210. In this case, only one of the spring members may be a coil spring that contacts one of the conductive members associated with one of the guide members near the hinge mechanism to open/close the image reading apparatus, and the other spring members may be wire springs that contact the other conductive members associated with the other guide members.

In addition, the earth contacts according to the above-mentioned embodiments may be applied to the case where all guide members are any one of guide shafts or guide rails.

Further, other forms of connection than that illustrated in FIG. 5 may be employed between the conductive members as the earth contacts and the guide members.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-154402 filed Jun. 11, 2007, which is hereby incorporated by reference herein in its entirety.

What is claimed is:

1. An image forming apparatus with an image reading unit and an image forming unit,
    said image reading unit comprising
    a movable carriage having a light source adapted to expose an original, a photoelectric conversion element, and a drive circuit unit adapted to drive said photoelectric conversion element,
    a plurality of guide members adapted to guide said movable carriage, and
    a plurality pair of conductive members adapted to connect to respective both end sides of said plurality of guide members, wherein
    said plurality of guide members are individually earthed to a housing of said image forming unit through said plurality pair of conductive members, and
    said image forming unit comprises a plurality pair of another conductive members disposed on the housing of said image forming unit to contact to said plurality pairs of conductive members, respectively.

2. An image forming apparatus according to claim 1, wherein a housing of said image reading apparatus is made of a non-conductive member.

3. An image forming apparatus according to claim 1, wherein said drive circuit unit is connected through a flexible flat cable to an image processing unit within said image reading apparatus.

4. An image forming apparatus according to claim 1, wherein said conductive members connected to the respective both end sides of said plurality of guide members are different in the length of the earth path from one another.

5. An image forming apparatus according to claim 1, wherein the respective earth paths associated with said plurality of guide members are different in the entire length from one another from one another.

6. An image forming apparatus according to claim 1, wherein said another conductive members disposed on the housing of said image forming unit is comprised of spring members.

7. An image forming apparatus according to claim 6, wherein said spring members that contacts to said conductive members connected to the both ends of one of said guide members are configured as coil springs, and wherein said spring members that contact to said conductive members connected to the both ends of another one of said guide members are configured as wire springs.

* * * * *